April 22, 1969          M. DANJES          3,439,807

PLANT FOR BIOLOGICAL PURIFICATION OF SEWAGE WATER

Filed Sept. 9, 1966

INVENTOR:
M. Danjes
BY
Richards & Geier
ATTORNEYS

April 22, 1969    M. DANJES    3,439,807
PLANT FOR BIOLOGICAL PURIFICATION OF SEWAGE WATER
Filed Sept. 9, 1966    Sheet 3 of 4

INVENTOR:
M. Danjes
BY
Richards & Geier
ATTORNEYS

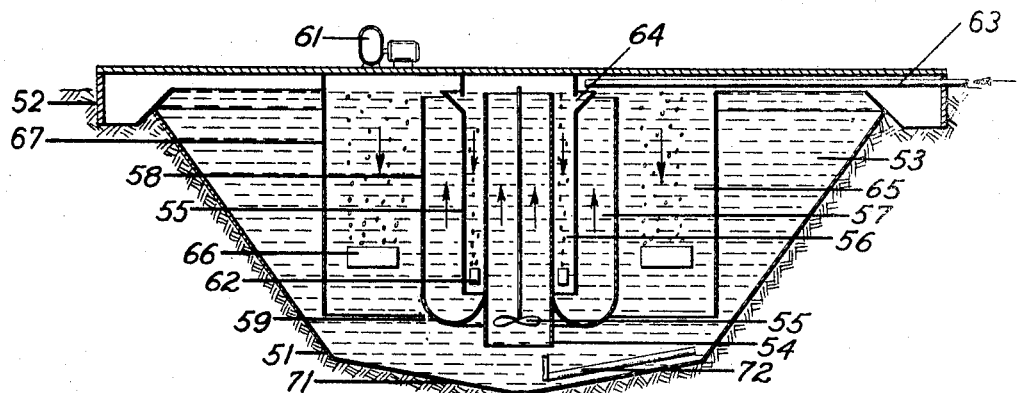
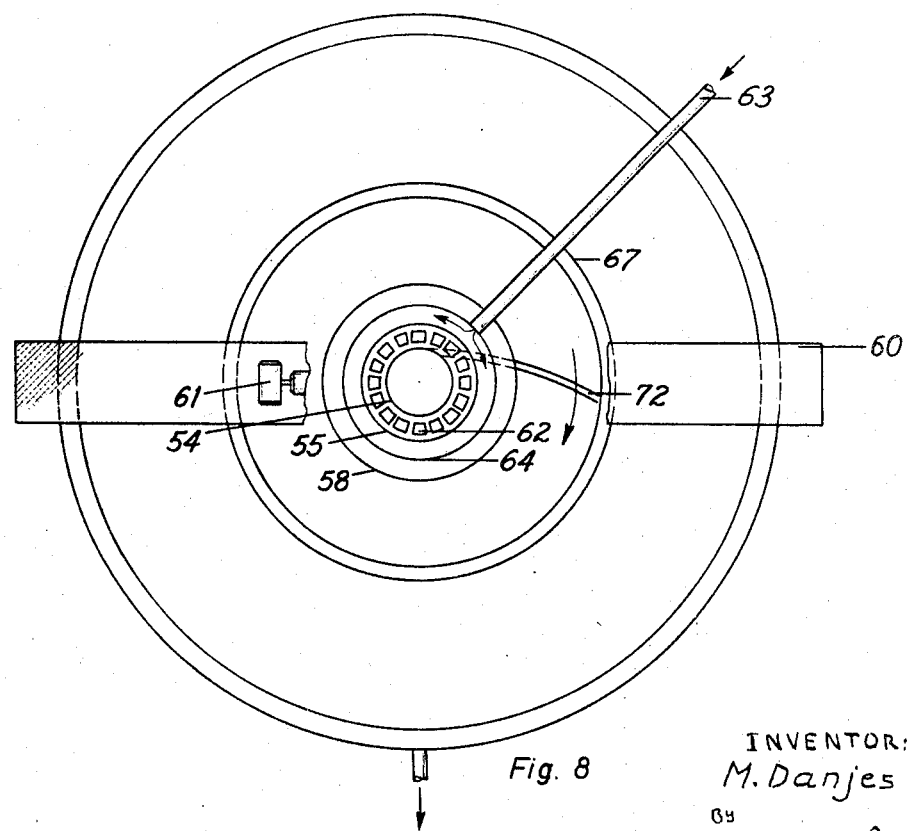

United States Patent Office 3,439,807
Patented Apr. 22, 1969

3,439,807
PLANT FOR BIOLOGICAL PURIFICATION
OF SEWAGE WATER
Martin Danjes, Hermannstrasse 3, Detmold, Germany
Filed Sept. 9, 1966, Ser. No. 578,208
Claims priority, application Germany, Sept. 14, 1965,
D 48,204; Oct. 15, 1965, D 48,433; Apr. 6, 1966,
D 49,800
Int. Cl. C02c 1/10
U.S. Cl. 210—197  1 Claim

ABSTRACT OF THE DISCLOSURE

Sewage water is biologically purified in an aerating basin by providing a vertical upwardly directed flow from the bottom of the basin and then deflecting this flow to move vertically downwardly while injecting air bubbles into the downwardly flowing current which rise therein at a speed slower than the speed of the downwardly flowing current. The aerating basin is provided with suitable means producing these currents, including radially disposed aeration boxes and V-shaped guides located around the lower ends of the aeration boxes.

---

The present invention relates to a method of biological purification of sewage water, which includes the employment of an aerating basin for mechanically operated circulation and separate aeration of the sewage water, and to a plant in which this method is carried out.

In a method of this type it is known to raise the sewage water successively along the aeration basin from the region of the bottom of the basin, whereby a partial current is caused to flow substantially horizontally at the region near the surface of the water, the sewage water being artificially aerated whilst flowing substantially horizontally near the surface.

The present invention has for its object to improve this principle of partial circulation and aeration, to provide an especially effective aeration of the sewage water and mud mixture, to obtain an especially effective biological purification of the sewage water and at the same time to reduce building expenses and energy consumption.

According to the present invention this is achieved in that the horizontal partial current of the sewage water is aerated and deflected vertically downwardly. The flowing rate of the downwards flowing sewage water current is made faster than the rising rate of the fine air bubbles being introduced into the region of the horizontal current.

As the velocity of the partial current of the sewage water flowing firstly horizontally and afterwards vertically, is higher than the rising rate of the air bubbles being introduced into the region of the horizontal current, new boundaries between the rising air bubbles and the sewage water are always provided, thus a considerable introduction of oxygen into the sewage water is achieved. The air bubbles may be introduced into the horizontal partial current only a few inches below the water surface, so that the aeration depth and thus also the energy demand are kept low.

It is preferable to continue the downward flow of the sewage water by a vertical upward flow, in which the air bubbles having been carried along with the sewage water when flowing downwards rise freely. The invention is of special importance in connection with a purification plant comprising a circular aeration basin, which is surrounded by an annular secondary purification basin and connected with the latter to a circular building construction.

According to a further feature of the present invention the deflection of the horizontal partial sewage water current to a vertically downwards directed flow in such a circular basin is carried out in that a partial current of the sewage water is raised from the region of the bottom of the basin in a vertical pipe arranged at the middle axis of the circular basin. At the upper end of the pipe lying beyond the sewage water level the partial current is turned round firstly horizontally and afterwards vertically under simultaneous aeration, suitably by a surrounding concentric, cylindrical guide surface, which forms together with the centric pipe an annular space of such a diameter that the vertical downwards flow of the sewage water receives a higher velocity than the rising rate of the air bubbles being introduced into the region of the horizontal current. This cylindrical guide surface being arranged concentrically to the middle axis of the circular basin suitably is dipped into the aeration basin from the sewage water surface down to slightly above the bottom of the basin, whereby the air bubbles are carried along by the vertical water current and are directed downwardly nearly to the bottom of the basin, and thus corresponding to the length of the concentric guide surface new boundaries between the air bubbles and the water are always present.

This has the same effect as if the air would be introduced into the lower end of the concentric guide surface, i.e. with great aeration depth, however, it requires much less energy.

The air bubbles being carried down with the vertical patial current of the sewage water rise afterwards through calm sewage water. Due to the low aeration depth the sewage water is aerated with a minimum demand of energy, at which a maximum of boundaries between air bubbles and sewage water is obtained, which is essential for the diffusion of oxygen.

The leading down of the air bubbles from the region of the horizontal current near the water surface to the depth of the aeration basin requires only a flowing rate of the water according to the formula $v^2:2g$, whereby V needs to be only a little higher than the rising rate of the air bubbles. The conveying height of the conveying equipment being in use, e.g. a rotational pump, needs to be ⅕ inch to 0.8 inch only. If the aeration equipment has an entering resistance—resistance of the filter+aeration depth—of about 12 to 16 inches, new boundaries are obtained on a way of 17 yards if the length of the cylindrical guide surface is 2.2 yards.

If the aeration depth is 16 inches an energy demand for lifting a corresponding amount of water to about 0.7 inch is necessary, whereby a diffusion of oxygen of the same effect is obtained as if the air would be blown into standing water at a depth of 17 yards.

The vertical downward flow of the sewage water taught by the present invention after its aeration thus results in a considerable effective aeration and a high purification effect for the sewage water at lowest aeration depth and energy demand.

According to a further embodiment of the invention a vertical pipe is arranged in the middle axis of the circular, funnel-shaped purification basin, the pipe surrounding a water conveying equipment and having openings at its upper end, through which the sewage water being conveyed upwardly within the pipe flows into aeration boxes being arranged starlike around the pipe. One air distributor is inserted into each of these boxes, from which air emerges in fine bubbles and enters into reciprocative effect with the sewage water current being directed upwards in the seration boxes.

The velocity of the downward movement of the sewage water within the areation boxes is chosen so that it is about equal to the upward movement of the air bubbles. At such a plant the velocity of the water circulation and the amount of inserted air may be regulated separately, so that an optimum adaptation to the sewage water conditions in question is possible.

Suitably the inflowing sewage water is directed into the upper end of the vertical pipe so that it is at once circulated and aerated.

It is recommended to arrange the lower end of this pipe at such a distance from the funnel-shaped bottom of the purification plant that a flowing rate necessary to carry away the deposited mud occurs at this place, whereas in the other parts of the plant a considerably lower velocity of the sewage water is present. As only a small part of the sewage water contained in the purification plant is circulated and this circulated part is flowing only a minor part of its way with a relatively high velocity only a small supply of energy is necessary for the circulation.

Preferably the blast providing the air as well as the motor part of the rotation pump are arranged on a bridge crossing the circular purification basin and being horizontally rotatable around the central axis of the plant.

The wall separating the secondary purification basin from the annular aeration chamber suitably ends so far above the funnel-shaped bottom of the purification plant that the mud deposited in the secondary basin can slip back into the main circulation through the slots.

In order to remove supplementary mud these slots can be covered partly by a device so that the mud gathers above the slots and is removed via a suction pipe.

To take best advantage of the purification space, it is advisable to aerate the newly added sewage water as quickly as possible and to mix it with the active mud. Thereby an instant vaccination with the bacteria present in the purification basin occurs so that the biological reduction can begin immediately after aeration.

According to another embodiment of the present invention the aeration device is arranged in an annular space concentric to the vertical rising pipe, in which space the sewage water being conveyed upwards within the rising pipe is moved downwards again so that the air bubbles rising from the aeration device get into ample contact with the sewage water according to the reciprocal flowing system and form a maximum of boundaries when rising upwardly. The annular space is connected with a second annular space by a deflection device underneath the annular aeration device, in which second annular space the sewage water rises again to get into the free space of the plant after having reached the vicinity of the water level of the purification plant and finally to flow again into the lower end of the vertical pipe for a new cycle.

According to a further embodiment of the present invention a funnel-like guide surface is arranged between the first and the second concentric annular space near the water surface, which guide surface is in connection with the inner concentric annular space by passages. The pipe leading the raw sewage water ends above this guide surface. Thereby the sewage water gets at once into the region of the aeration in which it is thoroughly mixed with the sewage water being already treated and is provided with bacteria.

Preferably the bottom of small purification plants is built like a cone so that the mud depositing at the walls of the cone slides downwards and gathers below the suction opening of the middle pipe. If required the mud can be removed from time to time by special conveying equipment.

In great plants the lower trunicated cone may be flattened in order to avoid greater building depths, and the mud gathering at the flattened part is pushed to the vicinity of the suction opening by a rake. Suitably the rake is firmly arranged at the lower end of the middle pipe, which is placed in slow rotation.

The effect of the aeration can be improved by a second aeration device arranged within a third annular space following the second annular space. In the third annular space the sewage water flows downwards again, whereby a certain amount of the oxygen inserted into the first annular space is used. The oxygen necessary for the reduction can be introduced in better distribution in this further embodiment of the present invention so that optimum insertion conditions can be obtained.

Further advantages and details of the invention will become apparent from the following more detailed description which is made with reference to the accompanying drawings in which several examples of plants for carrying out the method according to the invention at purification plants with circular basins are illustrated.

In the drawings:

FIG. 7 is a vertical section, and

FIG. 8 is the top view of another variant.

Figure 1:
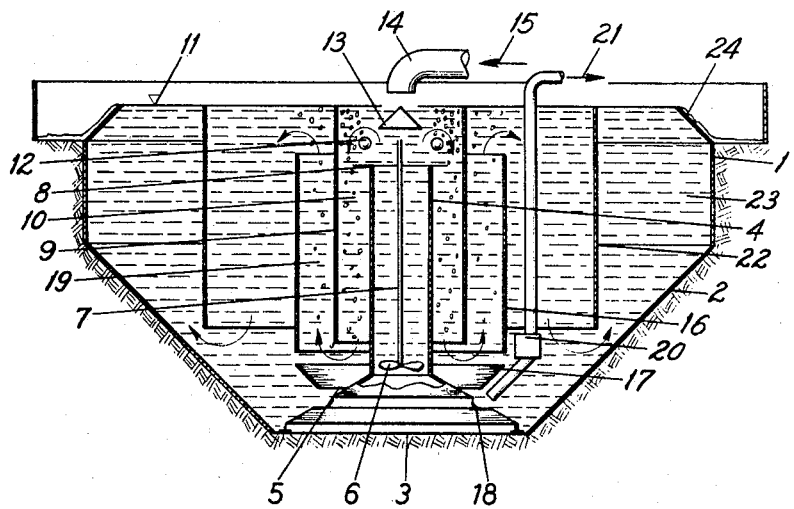
FIG. 1 is a vertical section of an embodiment of the circular basin.

According to FIGURE 1 a circular basin 1 having a wall 2 which has a cone-like shape up to the horizontal bottom 3 of the basin, is inserted into the soil 1. A vertical rising pipe 4 is mounted in the middle axis of the circular basin 1, the lower end of said pipe continuing in a cone surface 5. A conveying equipment in form of a rotation pump 6 is placed in the lower end of the rising pipe 4, which pump can be driven by an electric submersible motor being directly coupled with the pump, or as shown in the embodiment can be driven by a vertical shaft 7 of a not illustrated electric motor arranged above the soil or on a bridge crossing the basin. A horizontal annular guide surface is arranged at the upper end of the rising pipe 4, which surface ends in an annular channel 10 formed by a cylinder surface 9. Above the horizontal guide surface 8 an aeration device 12 consisting of horizontal air distributing pipes connected to a not shown air blast is arranged near the water surface. A cone surface 13 is arranged in the middle axis of the rising pipe 4 above the horizontal guide surface 8, which cone surface is coaxial with the emerging opening 14 of a leading pipe 15 for the sewage water.

The cylinder surface 9 is surrounded by a further concentric, cylindrical guide wall 16 underneath which a funnel-shaped surface 17 is arranged which supplies foam and the like, deposited thereon in a gathering gutter 18 arranged in the lower cone surface 5. Above this gathering gutter serving as sand collector there is provided a compressed air driven liquid conveyor 20 built like a mammoth pump, by which the deposits are conveyed from the gutter 18 into a draining pipe 21. Also arranged above the gutter 18 serving as sand collector is an annular space 19 being bounded by the cylinder surface 9 and the guide wall 16. The aeration basin is bounded by a cylindrical wall 22, which with the outer wall of the circular basin 1 forms a secondary purification basin from which the purified water flows off through a gutter 24.

The sewage water flowing through the pipe 15 gets out of the leading pipe 15 via the cone surface 13 into the annular channel 10, in which it flows downwards until it is deflected into a back flow by the funnel-like guide surface 17 and into the annular space 19, where it rises again. A part of the sewage water current is pumped upwards from the region of the bottom 3 of the basin within the rising pipe 4 by the rotation pump 6, and flows thereafter downwards across the horizontal guide surface 8 within the annular channel 10, where it joins the newly added sewage water.

The partial current emerging from the rising pipe 4 and horizontally deflected by the guide surface 8 spreads over the air distributing pipes 12 and is aerated by fine bubbles. The air bubbles are carried along by the sewage water flowing downwards in the annular channel 10. The flowing rate of the sewage water in the annular channel 10 is a little higher than the rising rate of the air bubbles emerging from the aeration pipe 12. For instance, the sewage water in the annular space 10 flows vertically downwards at a rate of 10 to 20 inches/sec., while the air bubbles have a rising rate of 15 inches/sec. Thus always new boundaries are formed in the above described way between the air bubbles and the water. The air bubbles rise freely together with the sewage water being deflected upwardly by the funnel-shaped surface 17 within the annular space 19 following the annular space 10 and get into the open atmosphere.

The velocity of the downward current necessary for giving new boundaries can be obtained by a corresponding proportion of the cross section of the passage of the annular channel 10. The partial current of the sewage water being directed downwards in the annular channel 10 thus is aerated very intensively and enriched with oxygen. The sewage water rising in the following annular space 19 therefore is considerably purified, and the separated mud has reached the gathering gutter 18 by the funnel-shaped guide surface 17, from where the mud is conveyed into draining pipe 21 by the mammoth pump 20. No mud deposits occur at the bottom 3 of the basin because the lower edge of the cone-like guide surface 5 has such a distance from the bottom 3 of the basin that there no mud deposits can occur.

The sewage water finally gets into the secondary purification basin 23, from where the purified water is removed through the gutter 24.

Figure 2:
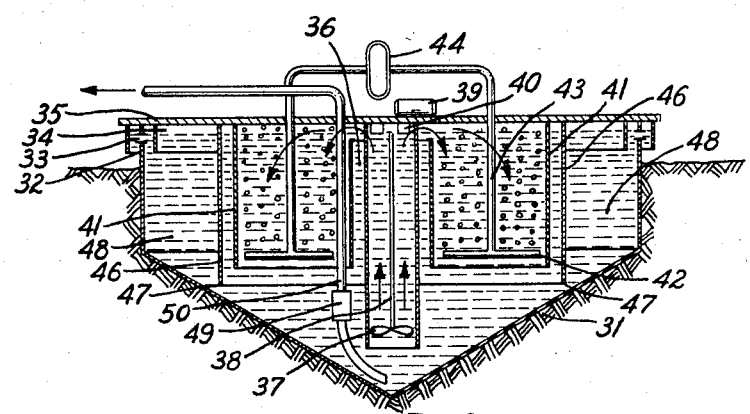
FIG. 2 is a vertical section of another embodiment.
Figure 3:
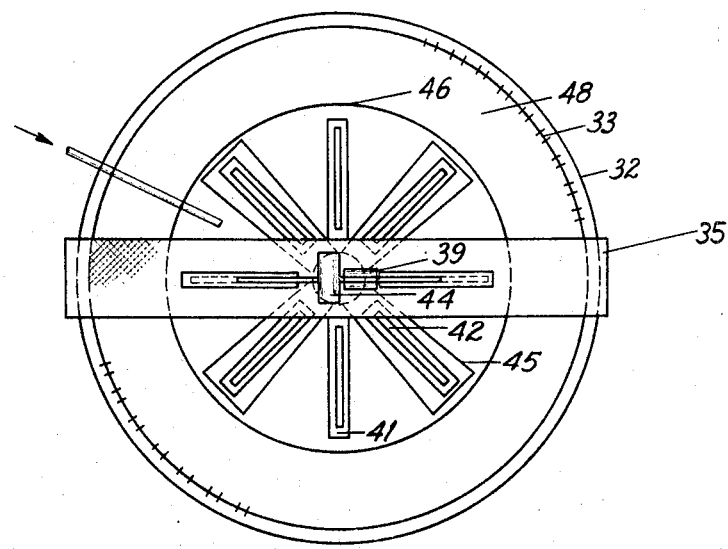
FIG. 3 is the top view of FIG. 2.

In the embodiment according to FIGURES 2 and 3 the circular basin 31 is surrounded by an annular gathering gutter 32 in which slots 33 end being arranged along the upper edge part of basin 31. In front of the slots 33 a cylindrical interception wall 34 is arranged, which keeps the mud particles swimming at the water surface from reaching the slots 33.

A path-like bridge 35 is arranged above the circular basin 31 to which a vertical rising pipe 36 coaxial with the middle axis of the circular basin 31 is attached. A rotating conveying equipment, e.g. a propeller or a rotation pump is connected with a vertical shaft 38 in the lower part of the rising pipe 36. The shaft is driven by an electric motor 39 arranged on the bridge 35 with such a rotation direction that the sewage water is conveyed upwards within the rising pipe 36.

The sewage water emerges through slots 40 at the upper end of the rising pipe 36 and enters the upper end of a plurality of radially arranged aeration boxes 44 which are open at the top and at the bottom and have a rectangular cross section. Air distributing pipes 42, which are connected to a blast 44, arranged on the bridge 35, by air conveying pipes 43 are arranged in the aeration boxes 41.

The air emerges in form of fine bubbles from the air distributing pipes 42. The bubbles move within the aeration boxes 41 against the downwardly directed current of the sewage water so that an eager exchange between the air and the sewage water particles forming the boundaries of the bubbles takes place. Thereby the sewage water intensively takes up air oxygen, and the bacteria causing the reduction of sinking materials receive optimum life conditions in the relatively quietly flowing sewage water enriched with oxygen.

Figure 4:
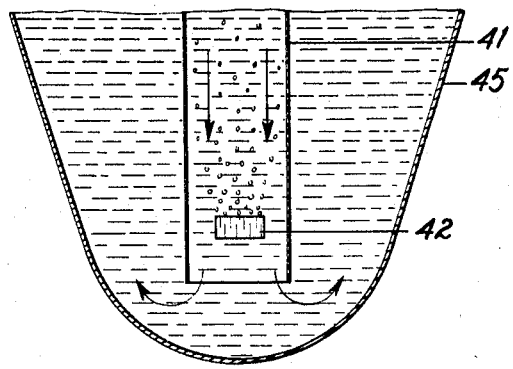
FIG. 4 is a partial cross section of a detail of FIG. 2 in an enlarged scale.

As shown in FIG. 4 the aeration boxes 41 are surrounded at their lower ends by a V-shaped guide surface 45, by which the aerated sewage water is led in such manner that it can only regain the rising pipe 36 after having flown through a free part of the aeration basin. This is accomplished by placing the inner edges of these guide surfaces close to the rising pipe 3 (see FIG. 3). Besides, the formation of current rolls is avoided by the aeration boxes 41 and the aeration is limited to an exactly determined part of the sewage water.

The aeration boxes 41 are surrounded by a cylindrical guide wall 46 which is the inner boundary of the secondary purification basin 47 and extends down to nearly the bottom of the circular basin 31 thus forming an annular space 47. Hereby the mud deposited in the secondary purification basin 48 can slide through so that it gets back into the aeration circulation.

By means of a compressive air driven liquid conveyor 49 which is built like a mammoth pump and which has a conveying pipe 50 along the bridge 36 across the edge of the basin 31 the mud gathering at the bottom of the basin can be removed from time to time. To carry this out the blast 44 of the air distributing pipes 42 is switched off and supplies the compressive air necessary to drive the mammoth pump 49.

The annular space 47 between the lower edge of the guide wall 46 and the bottom of the basin can be covered so that the mud of the secondary purification basin 48 may gather at the covers and can be removed also from the secondary purification basin 48.

Figure 5:
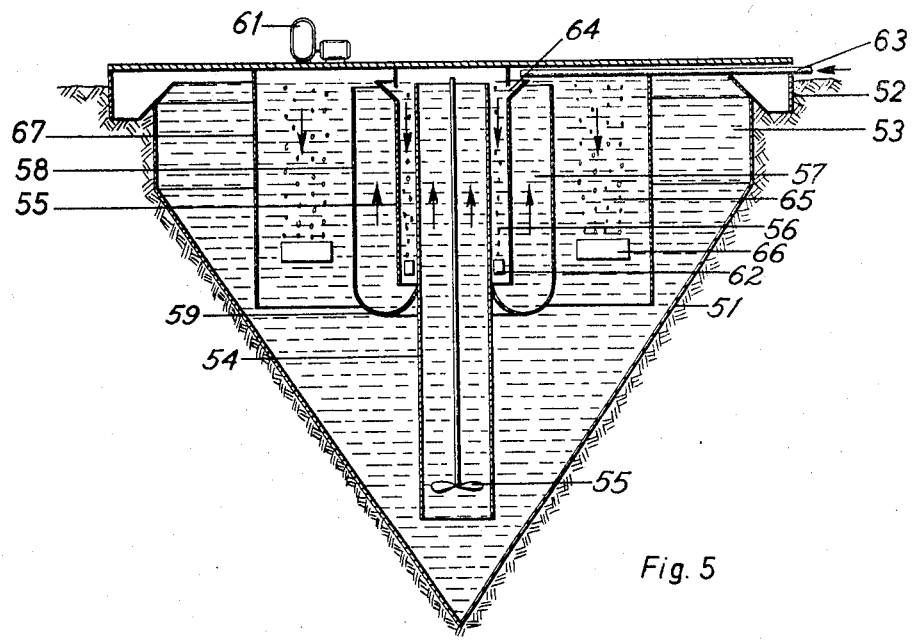
FIG. 5 is a vertical section of another embodiment.
Figure 6:
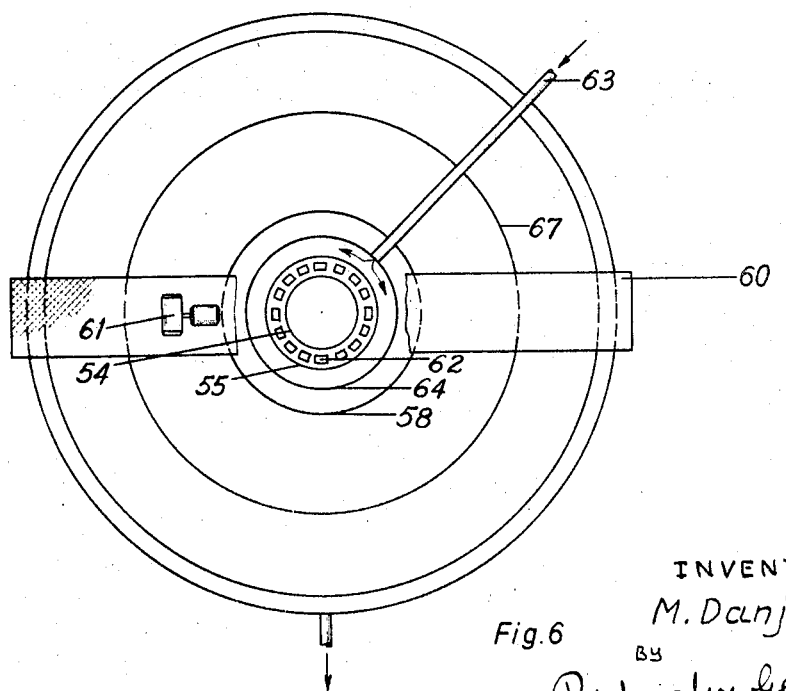
FIG. 6 is the top view of FIG. 5.

In the embodiment according to FIGURES 5 and 6 the circular basin 51 inserted into the soil is surrounded by a gutter 52 to gather the biologically purified water flowing out of the secondary purification basin 53. Along the middle axis of the basin 51 a rising pipe 54 reaching nearly to the bottom is arranged in which a rotor 55' of a water conveying pump is arranged. A cylindrical surface 55 is arranged around the upper part of the rising pipe 54, thus building the outer wall of an annular aeration space 56 and the inner wall of the second annular space 57. The annular surface 58 forming the outer boundary of the annular space 57 is connected with the rising pipe 54 via valve-like closing elements 59, so that the annular spaces 56 and 57 are connected one behind the other with regard to the flow of the sewage water.

A blast 61 supplying the air serving for aeration of the sewage water and leading the air to the aeration device 62, which is arranged in the annular space 56, is mounted on a bridge 60.

A pipe 63 serves for the flow of the sewage water to be treated and ends directly beside the upper part of the cylindrical surface 55. A funnel 64 which is connected via slots with the annular aeration space 56 is arranged near the upper part of the cylinder surface 55.

The sewage water to be treated firstly gets into the funnel 64 after emerging from pipe 63 and flows into the annular aeration space 56, where it is thoroughly mixed with the already conveyed mud and water mixture and at the same time is aerated. The air bubbles emerging from the aeration device 62 rise in the annular aeration space 56 against the moving direction of the sewage water to be treated. The aerated sewage water afterwards is directed into the annular space 57 by the closing elements 59 building a deflection device, and it moves upwards again within the annular space 57 to sink finally after having reached the vicinity of the water level downwards in the remaining annular space 65. After sinking down and after the extraction of the oxygen the aerated sewage water reaches the lower opening of the rising pipe 54 being arranged in the region of the cone top, and is again taken into the aeration circulation.

The sewage water current being directed downwards in the annular space 65 can be aerated a second time by air filters 66. Thereby the supply of oxygen by the aeration device 62 can be kept within the optimum region of supply at all load conditions, in that part of the complete oxygen demand is added according to the oxygen used during the movement of the sewage water from the region of the aeration device 62 to the filters 66.

The mud arising during the treatment of the sewage water and being no more reducible can be removed if required from the cone top of the basin by means of a suitable pump.

The mud deposited on the turning (deflection) device can easily be drained into the cone top of the basin by a remotely operable opening of the closing elements 59.

By regulating the air supply and adjusting the conveying velocity of the amount of sewage water flowing in the middle pipe the plant can be easily adapted to the load conditions in question, whereby only a relatively small energy for introducing the required oxygen is necessary.

In the plant according to FIGURES 7 and 8 which is arranged with a flattened cone top 71 in order to avoid greater building depths a nearly tangential rake 72 is arranged at the lower end of the rising pipe 54. This rake pushes the gathered mud to the lower opening of the rising pipe 54 while carrying out a rotation of clockwise direction. The rake 72, which may also consist of two or more leaves facing each other diametrically, is firmly connected with the lower end of the middle pipe, and the pipe receives a slow rotation via a drive, e.g. from the blast motor.

A further regulation for adaptation of the load of the plant is possible by a vertical shifting of that pipe, the depth of which determines the deflection point of the aerated downwardly directed sewage water current into the upwardly directed current. Due to the reciprocal current system the effective aeration way can be changed to a multiple with regard to the vertical shifting of the pipe by slightly lowering or raising the deflection point.

It is to be understood that the embodiments which have been described can be modified in numerous ways without departing from the scope of the present invention as defined in the appendant claim.

What I claim is:

1. A plant for the biological purification of sewage water, said plant comprising an aerating basin, a vertical pipe fixed in said basin, a cylindrical baffle concentrically enclosing said pipe, an annular space being located between said pipe and said baffle, water conveying means within said pipe, said pipe having an upper edge providing an overflow of water rising upwardly in said pipe into said annular space, aeration boxes located within said annular space radially to said pipe, and a V-shaped guide extending around the lower ends of said aeration boxes at a predetermined distance therefrom and having an inner edge located adjacent said vertical pipe.

References Cited

UNITED STATES PATENTS

| 1,900,809 | 3/1933 | Hammerly | 210—194 |
| 1,744,785 | 1/1930 | McTaggart | 261—93 X |
| 2,165,889 | 7/1939 | Fischer et al. | 261—93 |
| 2,651,615 | 9/1953 | Kelly et al. | 210—197 |
| 2,963,430 | 12/1960 | Schreiber | 210—17 X |
| 2,530,814 | 11/1950 | Becze et al. | 261—93 |
| 2,633,344 | 3/1953 | Rekk | 210—197 X |

FOREIGN PATENTS

| 598,798 | 5/1960 | Canada. |
| 1,181,673 | 11/1964 | Germany. |
| 1,181,675 | 11/1964 | Germany. |
| 548,664 | 10/1962 | Great Britain. |

MICHAEL E. ROGERS, *Primary Examiner.*

U.S. Cl. X.R.

210—14, 220; 261—93